& Mathis

United States Patent [19]

Rayner

[11] Patent Number: 5,073,889
[45] Date of Patent: Dec. 17, 1991

[54] OPTICAL DISK CASE ASSEMBLY

[75] Inventor: Adrien P. Rayner, Malmesbury, United Kingdom

[73] Assignee: CMB Foodcan plc, Worcester, England

[21] Appl. No.: 503,776

[22] Filed: Apr. 3, 1990

[30] Foreign Application Priority Data

Apr. 18, 1989 [GB] United Kingdom ............. 8908691

[51] Int. Cl.⁵ .................. G11B 3/70; G11B 5/02; G11B 23/03; B65D 85/30
[52] U.S. Cl. .................. 369/291; 369/292; 360/133; 206/444
[58] Field of Search ........... 369/291, 270, 273, 292; 360/133; 206/444

[56] References Cited

U.S. PATENT DOCUMENTS

| 4,680,662 | 7/1987 | Fukushima et al. | 360/133 |
|---|---|---|---|
| 4,695,911 | 9/1987 | Loosen . | |
| 4,807,079 | 2/1989 | Takahashi | 360/133 |

FOREIGN PATENT DOCUMENTS

| 0042062 | 12/1981 | European Pat. Off. . | |
|---|---|---|---|
| 0077566 | 4/1983 | European Pat. Off. . | |
| 0085983 | 8/1983 | European Pat. Off. . | |
| 0097793 | 1/1984 | European Pat. Off. . | |
| 0164597 | 12/1985 | European Pat. Off. . | |
| 0164647 | 12/1985 | European Pat. Off. . | |
| 0215958 | 4/1987 | European Pat. Off. . | |
| 0255185 | 2/1988 | European Pat. Off. . | |
| 0271997 | 6/1988 | European Pat. Off. . | |
| 59-94277 | 5/1984 | Japan . | |
| 0248376 | 3/1988 | Japan | 206/444 |
| 0248377 | 3/1988 | Japan | 206/444 |
| 0248378 | 3/1988 | Japan | 206/444 |
| 2124012A | 2/1984 | United Kingdom . | |
| 2124819A | 2/1984 | United Kingdom . | |
| 2163887A | 3/1986 | United Kingdom . | |

Primary Examiner—Stuart S. Levy
Assistant Examiner—Tien Ba Pham
Attorney, Agent, or Firm—Burns, Doane, Swecker & Mathis

[57] ABSTRACT

An optical disk case assembly comprises A-side and B-side case parts (10,11). Each case part has a central opening (28) and a radially extending window (29). Metal shutters (12) and (17) are mounted for sliding movement on the case parts (10,11). A slide member (13) made from a plastics material is slidably mounted on the case part (10) and held in position by shutter (12). A slide member made from a plastics material is also mounted on the case part (11) and held in position by shutter (17). The slide member on the case part (11) engages the slide member (13) so that the two slide members together with shutters (12 and 17) move together. The slide member (13) has an operating tab (72) which engages a projection in a cartridge compartment so that the shutters (12 and 17) are caused to open during insertion of the case assembly into such a compartment). The case part (10) is also provided with a locking lever (15). The components associated respectively with the case parts (10,11) may be secured in position prior to inserting an optical disk. Consequently, in order to insert an optical disk, it is only necessary to place the optical disk in position and secure the two case parts (10,11) together with self-tapping screws (39).

6 Claims, 5 Drawing Sheets

OPTICAL DISK CASE ASSEMBLY

This invention relates to a case assembly for an optical disk. Such a case assembly, together with an optical disk, forms a cartridge which may be loaded into the cartridge compartment of an optical disk drive for performing read or write operations on the optical disk.

A known cartridge comprises an optical disk contained inside first and second case parts. In order to provide access to the optical disk when it is located in the cartridge compartment of an optical disk drive, each case part is provided with a central opening for receiving the spindle of a drive motor and a radially extending window for permitting an optical head to perform read and write operations on the surface of the optical disk. In order to protect the surface of the optical disk when the cartridge is not in a cartridge compartment, there is provided a single U-shaped shutter which is slidably mounted on the outside of the cartridge between a closed position in which it covers the windows and an open position in which the windows are uncovered. There is also provided an operating mechanism for moving the shutter between the closed and open positions.

In the final manufacturing stage of this known cartridge, the components of the operating mechanism are placed into the first case part, the optical disk is placed into the first case part, the second case part is placed over the first case part, the two case parts are secured together with self-tapping screws, and the shutter is clipped into position. Consequently, this known cartridge suffers from the disadvantage that the operations which have to be performed during the final manufacturing stage are of a complex nature. Where the case assembly and optical disk are manufactured remotely from each other or where the case assembly and the optical disk are produced by separate manufacturers, it is particularly inconvenient to have to perform such complex operations during the final manufacturing stage. Moreover, there is a demand to automate the final production stage and such automation is hard to achieve where such complex operations are required.

It is accordingly an object of this invention to provide a new or improved case assembly in which the above-mentioned disadvantage is overcome or reduced.

According to this invention there is provided a case assembly for an optical disk comprising first and second case parts arranged to cooperate to contain an optical disk, each of the first and second case parts having a window for permitting optical access to an optical disk located inside the case assembly, first and second shutters formed from a metal and slidably mounted respectively on the first and second case parts, each shutter being mounted for sliding movement between a closed position in which it covers the window of its associated case part and an open position in which it permits optical access through the window of its associated case part, and first and second slide members formed from a plastics material and mounted respectively for sliding movement on the first and second case parts, each slide member being held in position by the shutter of its associated case part and the first and second slide members and the first and second shutters being arranged to move together.

During the manufacture of a cartridge incorporating a case assembly of this invention, the first and second shutters may be mounted on the first and second case parts before the final manufacturing stage. Consequently, the operations which have to be performed during the final manufacturing stage are relatively simple in comparison with those required for the known cartridge discussed above.

This invention will now be described in more detail, by way of example, with reference to the accompanying drawings, in which.

Figure 1:
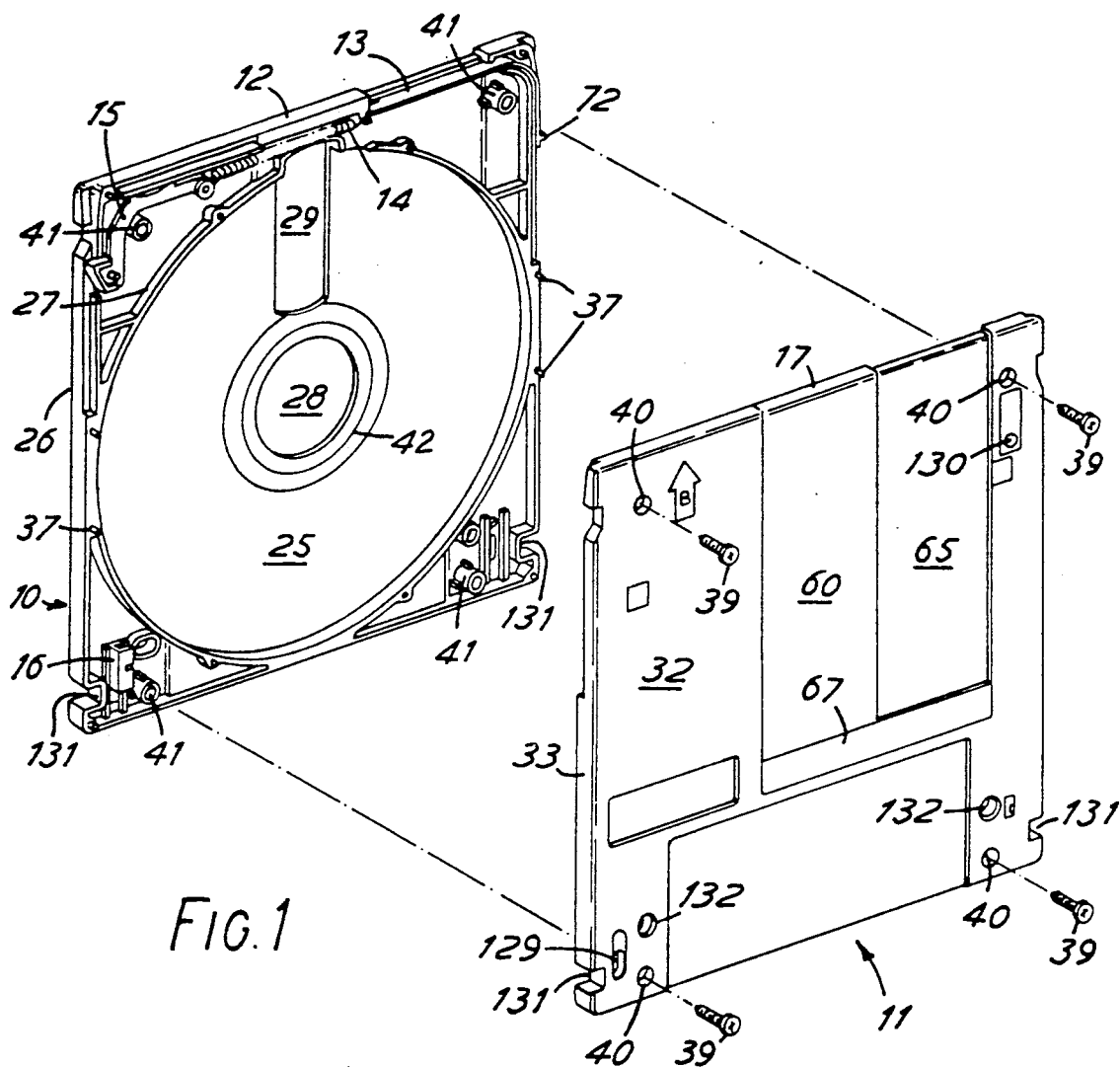
FIG. 1 is a perspective view of a case assembly embodying this invention with the A-side and B-side case parts separated from each other and showing the inside of the A-side case part and the outside of the B-side case part.
Figure 2:
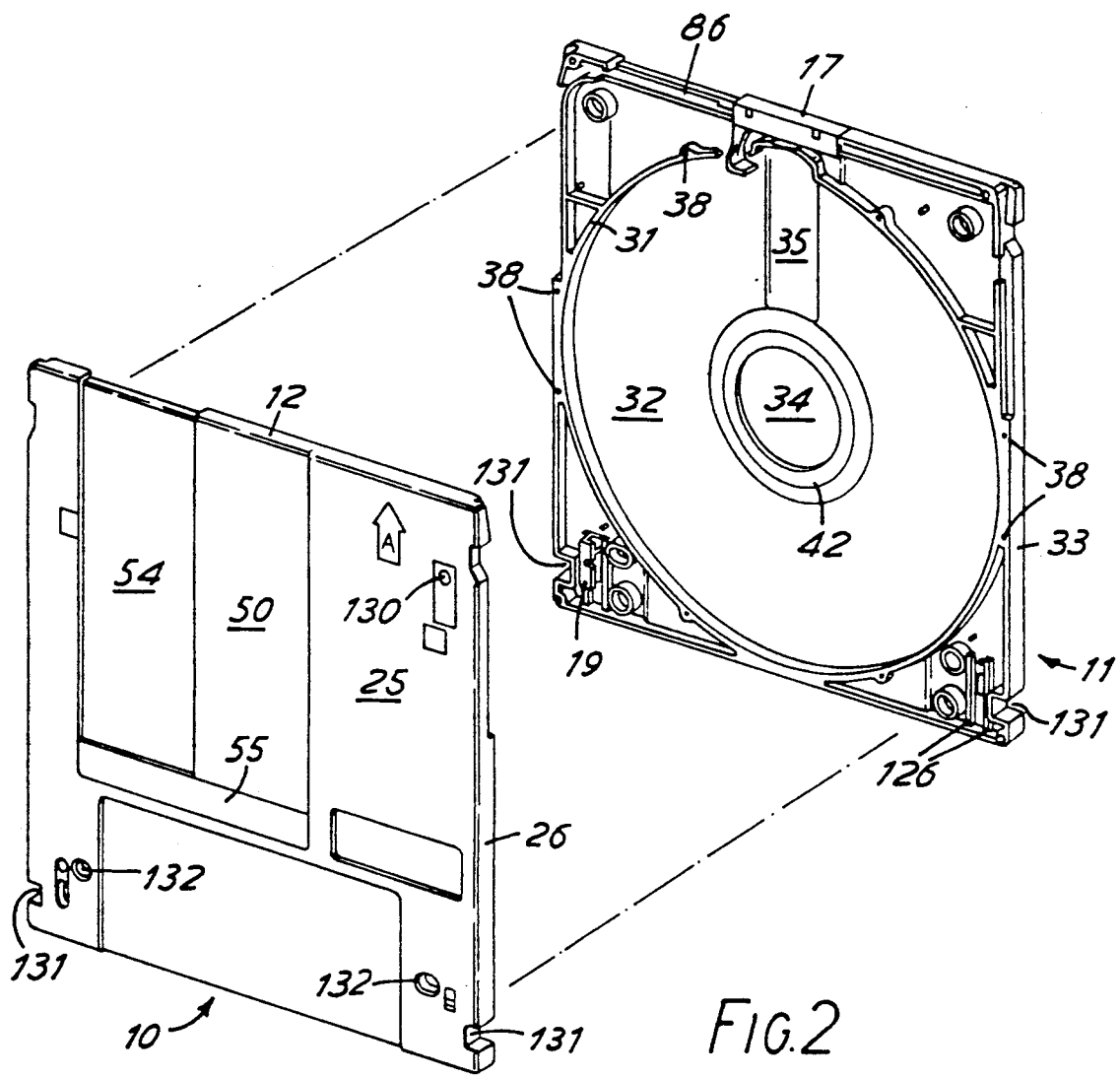
FIG. 2 is a perspective view of the case assembly of FIG. 1 showing the inside of the B-side case part and the outside of the A-side case part.

In FIG. 1, the case assembly is viewed in a direction which shows the outside of the B-side case part and, in FIG. 2, it is viewed in a direction which shows the outside of the A-side case part. Consequently, what is shown as the left-hand side of the case assembly in FIG. 1 becomes the right-hand side of the case assembly as it is shown in FIG. 2. For the sake of uniformity, the case assembly is described in this specification with reference to the orientation shown in FIG. 1.

Referring particularly to FIGS. 1, 2, 3 and 6 of the drawings, the case assembly comprises a first or A-side case part 10 and a second or B-side case part 11. Mounted on the A-side case part 10, there are provided an A-side shutter 12, an A-side slide member 13, a spring 14, a locking lever 15 and a write protection tab 16. Mounted on the B-side case part 11, there are provided a B-side shutter 17, a B-side slide member 18 and a write protection tab 19.

The A-side case part 10 comprises a generally planar square base wall 25 and a peripheral wall 26 extending around the edge of the base wall 25 towards the B-side case part 11. The A-side case part 10 also has a retaining ring 27 formed on the inside of the base wall 25. A circular opening 28 is formed in the centre of base wall 25 and a radially extending window 29 is formed in base wall 25 at a position spaced from opening 28. Similarly, the B-side case part 11 comprises a generally square and planar base wall 32 and a peripheral wall 33 extending around the periphery of base wall 32. The B-side case part 11 has a retaining ring 31. A circular opening 34 and a radially extending window 35 are formed in base wall 32.

The A-side and B-side case parts 10, 11 are provided with complementary location pins and holes 37, 38. The A-side and B-side case parts 10, 11 may be secured together by self-tapping screws 39 passed through apertures 40 in base wall 32 and received in bosses 41 formed on the inside of base wall 25. When the two case parts 10, 11 are secured together, the base walls 25 and 32 are together with the retaining rings 27 and 31 define a cylindrical space in which an optical disk may be housed. The base walls 25 and 32 have raised parts 42 on their inner faces extending around the edges of openings 28 and 34. The raised parts 42 prevent the surface of an optical disk from engaging the inner faces of base walls 25 and 32.

When an optical disk is housed inside the case parts 10, 11, the openings 28 and 34 permit the spindle of a drive motor to engage the optical disk in order to rotate it. The windows 29 and 35 provide access to the surfaces of the optical disk in order to permit an optical head to perform a read or a write operation.

The A-side shutter 12 has an elongate blade 50. The upper end of shutter 12 is bent to provide a horizontal web 51 extending from blade 50 and a downwardly depending web 52 extending from web 51. A pair of square apertures 53 are formed in web 52. The blade 50 slides in a recess 54 formed in the outer surface of base wall 25 between a closed position in which it covers opening 28 and window 29 and an open position in which it permits access to opening 29 and window 29. The lower edge of blade 50 is retained by a pelmet 55 glued to the outer face of base wall 25 at the bottom or recess 54. The upper part of shutter 12 is mounted for sliding movement in a manner which will be described. Similarly, the B-side shutter 17 comprises a blade 60 and webs 61 and 62. Apertures 63 are formed in web 62 and the blade 60 slides in a recess 65 formed in the outer face of base wall 32. The lower edge of blade 60 is retained by a pelmet 67 glued to the outer face of base wall 32.

Figure 3:
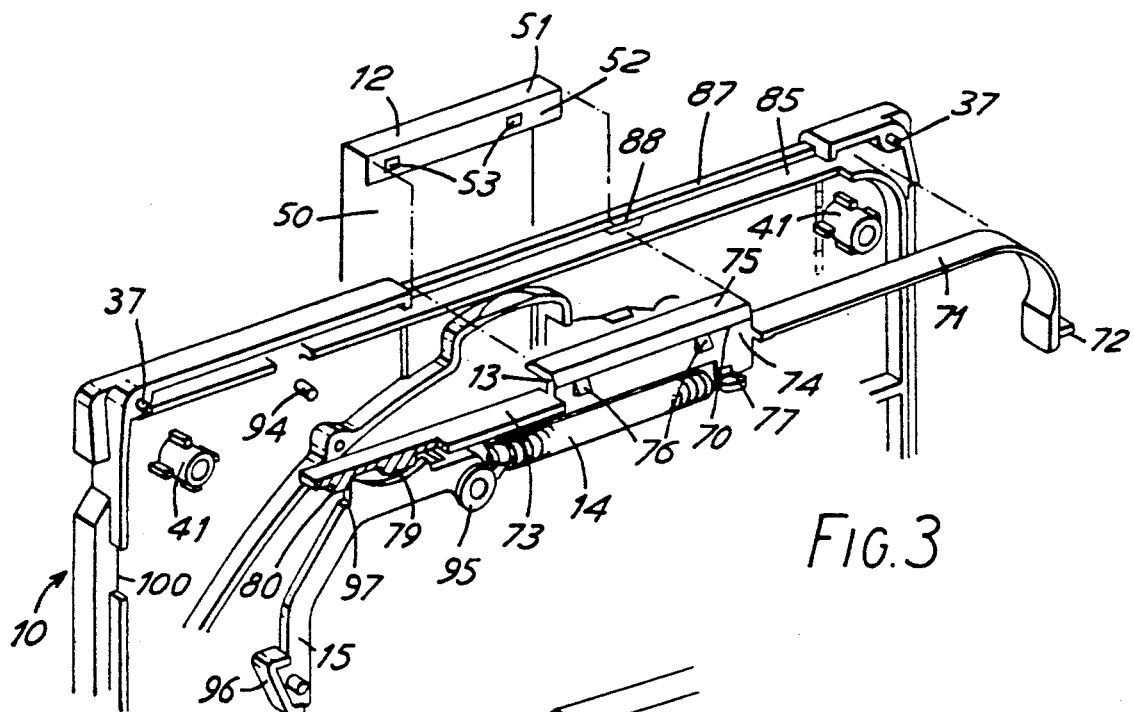
FIG. 3 is an exploded perspective view showing a fragment of the inside of the A-side case part together with its associated shutter and slide member and locking lever.
Figure 4:
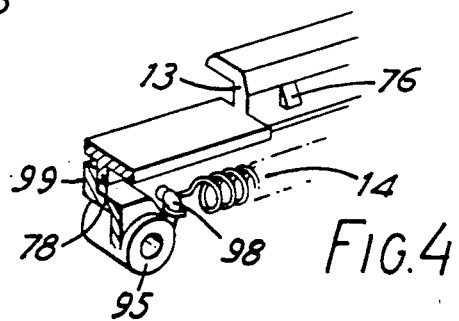
FIG. 4 is a perspective view showing the engagement between the hub of the locking member and the slide member associated with the A-side case part.

Referring particularly to FIGS. 3 and 4, the A-side slide member 13 comprises a central part 70, a first, flexible, strap 71 extending from the right-hand edge of central part 70 and terminating in an operating tab 72, and a second strap 73 extending from the left-hand edge of the central part 70. The central part 70 comprises a vertical limb 74 and a horizontal limb 75. The limb 74 is provided with a pair of projections 76. The horizontal limb 74 also has a hook 77 for engaging one end of spring 14. The second strap 73 has a downwardly depending web 78 extending approximately from its right-hand end to the middle thereof, a downwardly depending tab 79 located to the left of web 78, and a downwardly depending locking tooth 80 located adjacent its left-hand end.

A groove 85 is formed on the inside of peripheral wall 26 of the A-side case part 10. The groove 85 extends approximately from the upper left-hand corner of case part 10 to the middle of its right hand edge. As shown in FIG. 2, a complementary groove 86 is formed in the peripheral wall 33 of the B-side case part 11. For the width of recess 54, the cross-section of the peripheral wall 26 is reduced to provide a rail 87. When the case assembly is in an assembled condition, the straps 71 and 73 are loosely mounted for sliding movement in grooves 85 and 86 and the lower surface of the horizontal limb 75 slides along the rail 87. The upper part of the shutter 12 is clipped over the vertical and horizontal limbs 74, 75 of slide member 13 and projections 76 are engaged in openings 53. Thus, in the assembled condition, the shutter 12 holds the slide member 13 on to the case part 10. The tab 72 protrudes through a slit formed in the right-hand edge of the case assembly.

Figure 6:
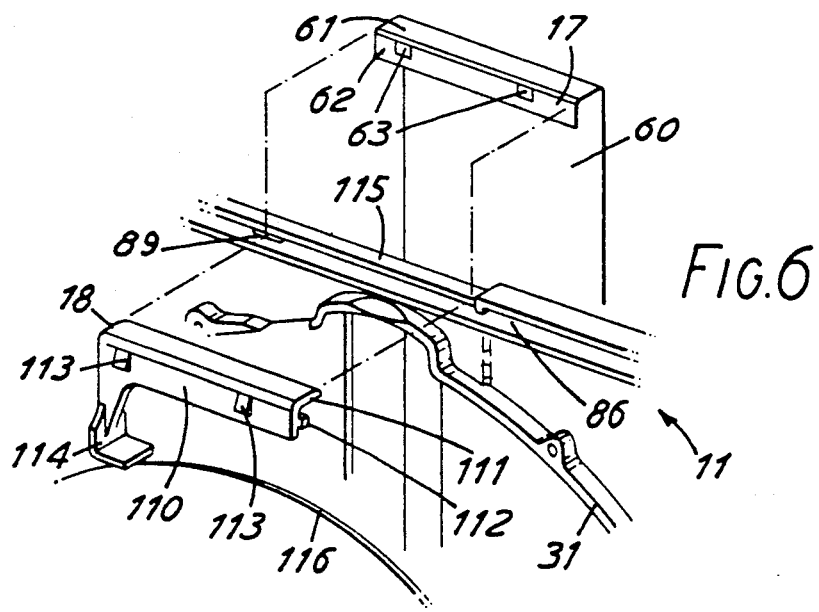
FIG. 6 is an exploded perspective view showing a fragment of the inside of the B-side case part together with its associated shutter and slide member.

The groove 85 is provided with a ramp 88 at a position approximately below the middle of rail 87. As shown in FIG. 6, a complementary ramp 89 is provided in groove 86. When the shutter 12 is in its closed position, the ramps 88 and 89 engage strap 71 thus restraining the shutter 12 from rotation about a vertical axis. Similarly, when the shutter 12 is in its open position, the ramps 88 and 890 engage the strap 73.

The outer edge of the horizontal limb 75 of slide member 13 protrudes slightly proud of the outer face of recess 54. Consequently, the inner face of blade 50 is slightly spaced from the outer face of recess 54 and any tendency for blade 50 to scrape material from the outer face of recess is avoided.

The locking lever 15 has a hub 95 which is pivotally mounted on a spindle 94 formed on the inner face of base wall 25. The axis of spindle 94 is not quite perpendicular to the plane of base wall 25 but extends away from the perpendicular by an angle of 1° towards the left hand edge of the case assembly. The locking lever 15 is provided with a head 96 at its end remote from the hub 95 and a locking tooth 97 at a position between hub 95 and head 96. The hub 95 is provided with a hook 98 for engaging the left-hand edge of spring 14. As shown in FIG. 4, the hub 95 also has a vertical projections 99 which engages the outer edge of web 78 of the strap 73. Thus, the locking lever 15 is secured to the case part 10 by the slide member 13. Also, in view of the inclination of the spindle 94, the spring 14 urges the locking lever 15 towards case part 10.

The spring 14 biases the slide member 13 together with the shutter 12 towards the left and thus biases the shutter 12 into its closed position. The spring 14 also biases the locking lever 15 in a clockwise direction into a locking position. In this locking position, the locking tooth 97 of locking lever 15 engages the locking tooth 80 of slide member 13 and thus prevents the slide member 13 from moving to the right. Also in the locking position, the head 96 protrudes through an opening 100 formed in the left hand edge of the case assembly.

As will be explained in more detail below, a pair of grooves are formed in the left- and ring-hand edges of the case assembly and, as the case assembly enters the cartridge compartment of a disk drive, a pair of projections pass along these grooves and engage the head 96 and the tab 72. As a result of the projection engaging the head 96, the locking teeth 80 and 97 are disengaged from each other. As a result of a projection engaged with the tab 72, the slide member 13 is moved to the right.

Referring now to FIG. 6, the B-side slide member 18 comprises a vertical limb 110, a horizontal limb 111 extending from the top of limb 110 and a short horizontal limb 112 extending from the middle of limb 110. Thus, the slide member 18 is F-shaped in cross-section. A pair of projections 113 are formed on limb 110. A shoe 114 extends from the bottom left-hand end of limb 110. The peripheral wall 33 of case part 11 is provided with a rail 115 generally similar to rail 87.

In the assembled condition, the shutter 17 is secured to the slide member 18 in a manner similar to that described with reference to shutter 12 and slide member 13. The limb 112 slides in the grooves 86 and the lower surface of limb 111 slides along the upper surface of rail 115.

Also in the assembled condition, the ends of slide member 18 engage the inner ends of straps 71 and 73 with the result that the slide members 13 and 18, and consequently shutters 12 and 17, move together. The shoe 114 is arranged to engage the edge 116 of an optical disk when the shutters 12 and 17 are in their closed positions and thereby prevent free movement of the disk.

Figure 5:
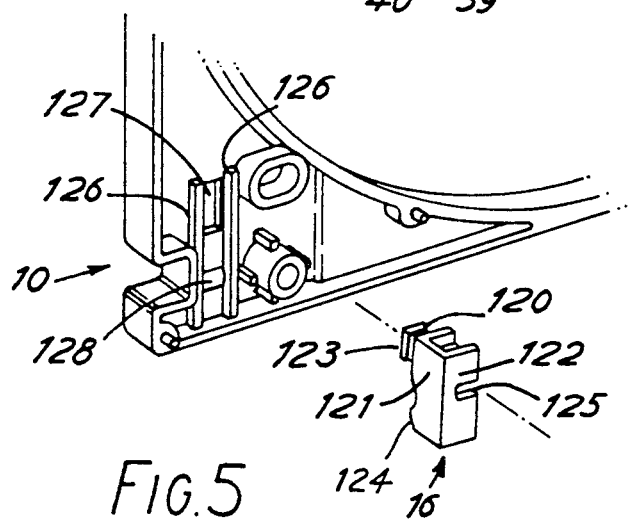
FIG. 5 is an exploded perspective view showing a fragment of the inside of the A-side case part and the associated write protection tab.

Referring particularly to FIG. 5, the write protection tab 16 is generally U-shaped and has an outer limb 120, a central limb 121 and an inner limb 122. A neck protrudes from the upper part of limb 120 and a head 123 is formed on the end of the neck. The lower part 124 of the limb 120 has an undulating profile. A U-shaped cut-out is formed in the middle of limb 122.

In the assembled condition, the tab 16 slides between rails 126 formed on the inner surfaces of base walls 25 and 32. The head 123 protrudes through an aperture 127 formed in base wall 25. The width of aperture 127 is slightly less than the width of head 123 with the consequence that head 123 secures the tab 16 to case part 10. Below the aperture 126, there is provided a ramp 128 which engages the undulating profile of lower part 124 so as to provide tab 16 with two stable positions. The position of tab 16 can be sensed through an aperture 129 provided in the base wall 32 of case part 11.

Figure 7:
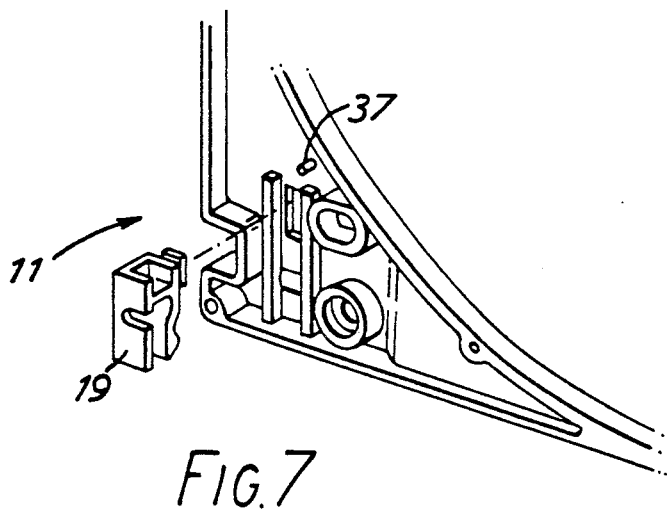
FIG. 7 is an exploded perspective view showing a fragment of the inside of the B-side case part and its associated write protection tab.

As shown in FIG. 7, the write protection tab 19 has an identical shape to right protection tab 16 and is mounted in an identical manner.

The base walls 25 and 32 are provided with holes 130 which may be used by a disk drive to detect when the case assembly is in the correct position and also as coding for the type of disk provided. The base walls 25 and 32 are also provided with location holes 132 which are engaged by pins in the disk drive to pull the case assembly into its correct position. The lower left- and right-hand edges of the case assembly are provided with grooves 131 which permit the case assembly to slide along rails provided in a storage device.

In the present example, the components of the case assembly are formed from the following materials. The case parts 10 and 11 are formed from polycarbonate. The shutters 12 and 17 are formed from stainless steel. The slide members 13 and 18, the lock member 15 and the write protection tabs 16 and 19 are formed from nylon. The pelmets 55 and 67 are formed from PVC sheet. However, as may be readily appreciated, other materials may be employed for forming the various components. The A-side and B-side case parts 10, 11, the slide members 13, 18, the lock member 15, and the write protection tabs 16, 19 are formed as an integral moulding.

In order to assemble the various components of the case assembly and an optical disk to form a cartridge, the following procedure may be adopted.

First, the locking lever 15 is placed in position on spindle 94 of the A-side case part 10. Then, the A-side slide member 13 is placed in position and the A-side shutter 12 is clipped over the slide member 13 thereby holding these three components in position. Then the spring 14 is secured in position. The write protection tab 16 is then clipped into position. Next, the B-side slide member 18 is placed in position and the B-side shutter 17 is clipped over it thereby holding these two components in position. The write protection tab 19 is then clipped in position. As will be clear from the above description, the components associated with the A-side and B-side case parts will remain in position during subsequent manipulations of these two parts.

If desired, the components of the case assembly may be assembled together at a location remote from the one at which the final manufacturing stage is performed. The A-side and B-side case parts 10, 11 and their associated components may be transported to the location for the final manufacturing stage loosely placed together.

In the final manufacturing stage, the A-side and B-side case parts are separated, an optical disk is placed into the retaining ring 27 of the B-side case part 11, the A-side case part 10 is placed over the B-side case part 11, and the two case parts are secured together with the self-tapping screws 39 to form the cartridge. As may be readily appreciated, the operations required during the final manufacturing stage are of a simple nature and so may be performed by simple robotic devices.

The A-side and B-side case parts 10, 11 may be readily separated for inspection and service of the optical disk and then reassembled.

The operation of the completed cartridge during insertion into the cartridge compartment of a disk drive will now be described with reference to FIGS. 8 to 11. The cartridge compartment has a pair of projections which are arranged to engage opposite sides of the cartridge as it is inserted. FIGS. 8 to 11 show a fragment of the A-side case part 10 together with the slide member 13 and locking lever 15 and one of the projections 140 during various stages of insertion and removal of the cartridge.

Figure 8:
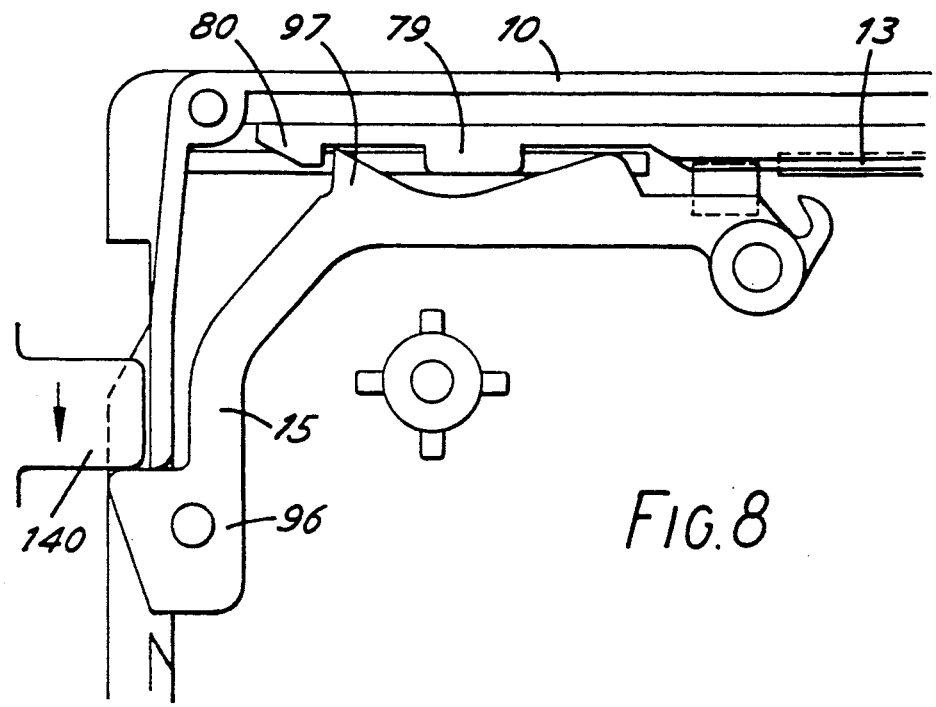
FIGS. 8 to 11 are sketches illustrating the operation of the locking lever as the case assembly enters a cartridge compartment.
Figure 9:
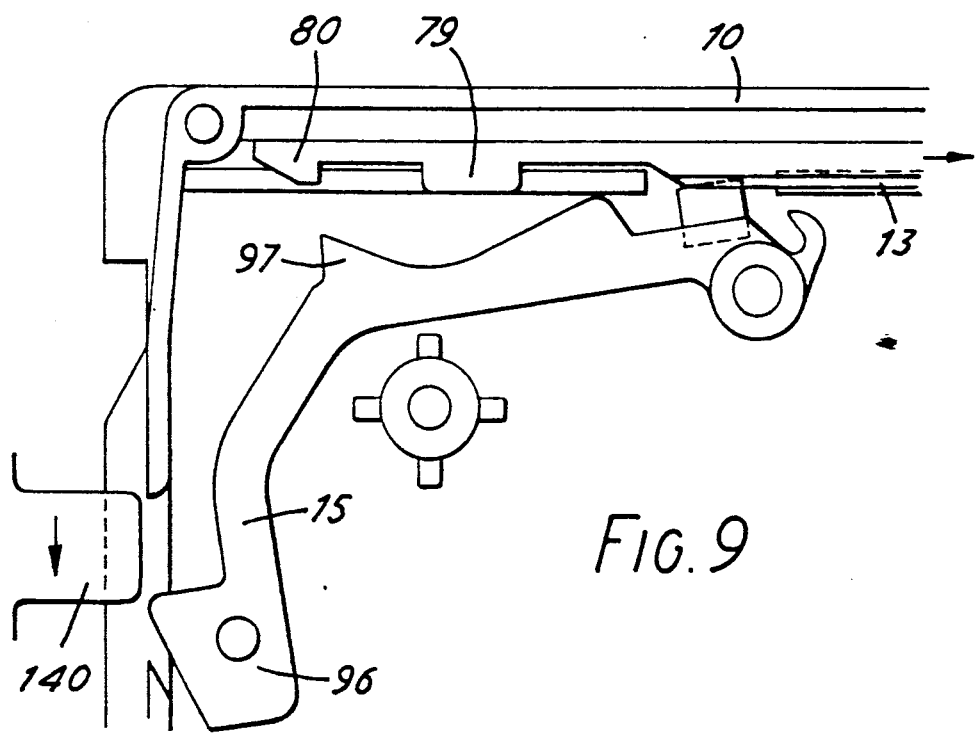

Referring to FIG. 8, during the initial stage of insertion of the cartridge, the projection 140 contacts the head 96. At this stage, the slide member 13 is still locked in position by virtue of engagement of locking teeth 80 and 97. As shown in FIG. 9, as the cartridge is pushed further into the cartridge compartment, the projection 140 causes the locking lever 96 to pivot thereby releasing the locking teeth 80 and 97 from each other and permitting the slide member 13 to move to the right. At the stage shown in FIG. 9, the projection on the opposite side of the cartridge compartment is coming into contact with the tab 72 at the other end of slide member 13.

Figure 10:
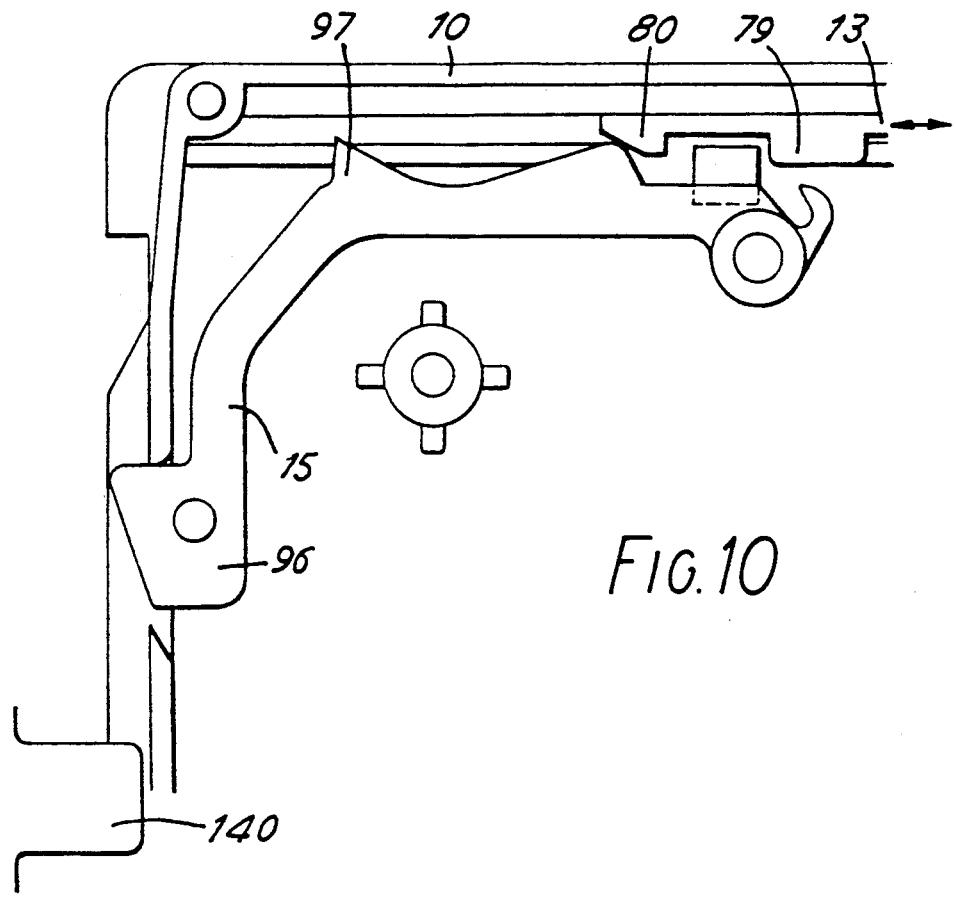

As shown in FIG. 10, during further movement of the cartridge into the cartridge compartment, the slide member 13 moves to the right thereby moving the shutters 12 and 17 into their open position. Also, during this further movement, the projection 140 becomes clear of head 96 and the locking lever 15 pivots back into its closed position under the influence of spring 14. FIG. 10 shows the cartridge fully inserted into the cartridge compartment. As the cartridge is removed from the cartridge compartment, the slide member 13 starts to move back to the left thus moving the shutters 12 and 17 towards their closed position.

Figure 11:
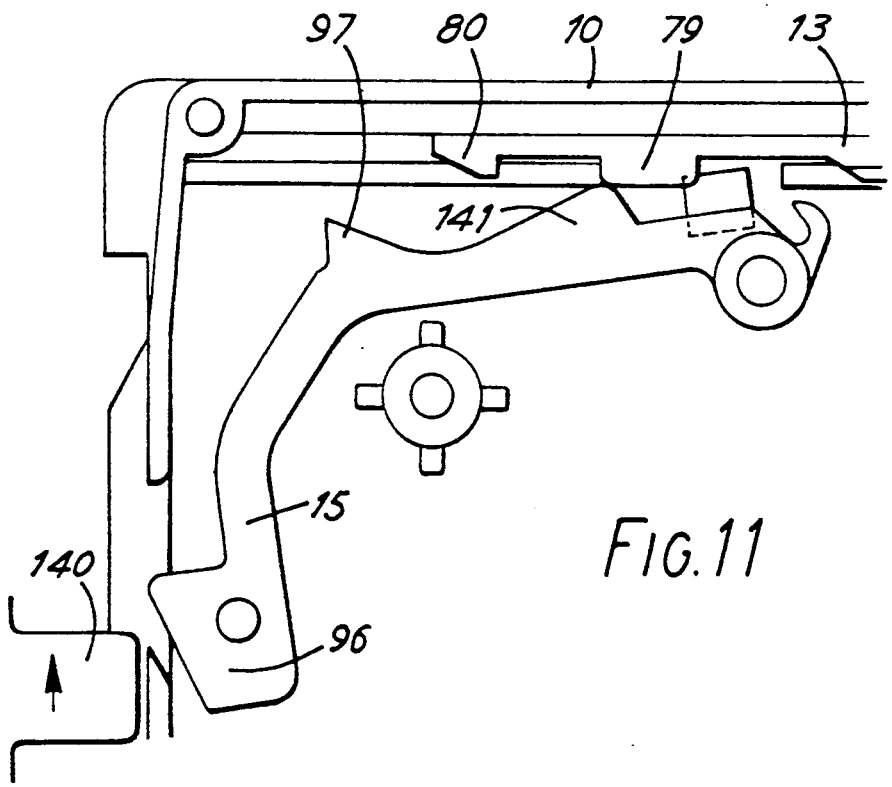

As shown in FIG. 11, during the return movement of slide member 13, the tab 79 engages a cam surface 141 formed on locking lever 15, thereby pivoting the locking lever 15 in an anticlockwise direction and preventing engagement between the projection 140 and head 96. Thus, there is no danger of the projection 140 causing damage during removal of the cartridge. When the cartridge has been completely removed, the locking lever 15 is returned to its locked position and the slide member 15 is moved to a position in which both shutters 12 and 17 are in their closed position and thus these components are in the positions shown in FIG. 8.

The cartridge which has been described above is designed for use with an IBM 3363 optical disk drive. However, the present invention is not limited to a case assembly for use with this particular disk drive and the case assembly may be adapted within the scope of the present invention for use with other types of disk drive. The case assembly may be adapted to contain an optical disk which is designed for storing alphanumeric or audio or video data.

What is claimed is:

1. A case assembly for an optical disk comprising first and second case parts arranged to cooperate when assembled together to contain an optical disk, each of the first and second case parts having a window for permitting optical access to an optical disk located inside the case assembly, first and second shutters formed from metal and respective first and second slide members formed from a plastics material, each slide member being adapted to be fitted to its respective shutter and to be retained thereby slidably mounted on its associated case part prior to assembly together of the two case parts, and means formed on the slide members whereby on assembly together of the two case parts, the first and second slide members and first and second shutters are constrained to move together between a closed position in which the shutters cover the windows of the case parts and an open position in which the shutters permit optical access through the windows of the case parts; the case assembly further including a locking lever pivotally mounted on a spindle formed on the first case part and provided with a head and a locking tooth, and biasing means for biasing the locking lever into a locking position, the locking lever being arranged so that, when it is in its locking position, the head of the locking lever protrudes through an opening in the periphery of the case assembly and the locking tooth of the locking lever engages a complementary locking tooth provided on the first slide member; wherein the first slide member is provided with a web and the locking lever is provided with a projection and wherein the web overlies the projection being in sliding engagement therewith so as to secure the locking lever to the first case part.

2. A case assembly for an optical disk comprising first and second case parts arranged to cooperate when assembled together to contain an optical disk, each of the first and second case parts having a window for permitting optical access to an optical disk located inside the case assembly, first and second shutters formed from metal and respective first and second slide members formed from a plastics material, each slide member being adapted to be fitted to its respective shutter and to be retained thereby slidably mounted on its associated case part prior to assembly together of the two case parts, and means formed on the slide members whereby on assembly together of the two case parts, the first and second slide members and first and second shutters are constrained to move together between a closed position in which the shutters cover the windows of the case parts and an open position in which the shutters permit optical access through the windows of the case parts; the case assembly further including a locking lever pivotally mounted on a spindle formed on the first case part and provided with a head and a locking tooth, and biasing means for biasing the locking lever into a locking position, the locking lever being arranged so that, when it is in its locking position, the head of the locking lever protrudes through an opening in the periphery of the case assembly and the locking tooth of the locking lever engages a complementary locking tooth provided on the first slide member; wherein the first slide member has a tab and the locking lever has a cam surface, the arrangement being such that the tab engages the cam surface as the first slide member together with the first shutter return from their open position to their closed position and thereby causes the head of the locking lever to be retracted from its opening.

3. A case assembly as claimed in claim 1 or claim 2, including means for biasing the shutters into their closed positions.

4. A case assembly as claimed in claim 1 or claim 2, in which the biasing means comprises a spring having one end secured to the first slide member and the other end secured to the locking lever, the spring being arranged so as to bias the locking lever into the locking position and simultaneously bias the first slide member together with the first shutter into their closed position.

5. A case assembly for an optical disk comprising first and second case parts arranged to cooperate when assembled together to contain an optical disk, each of the first and second case parts having a window for permitting optical access to an optical disk located inside the case assembly, first and second shutters formed from metal and respective first and second slide members formed from a plastics material, each slide member being adapted to be fitted to its respective shutter and to be retained thereby slidably mounted on its associated case part prior to assembly together of the two case parts, and means formed on the slide members whereby on assembly together of the two case parts, the first and second slide members and first and second shutters are constrained to move together between a closed position in which the shutters cover the windows of the case parts and an open position in which the shutters permit optical access through the windows of the case parts; wherein the first and second slide members each have a first horizontal limb arranged to overlie a peripheral wall of the respective case part and to slide thereon and a vertical limb depending from an inner edge of the first horizontal limb, and wherein the first and second shutters are each formed from a single sheet of metal bent to provide a blade overlying an outer face of the respective case part, a horizontal web overlying the first horizontal limb of the respective slide member, and a vertical web overlying the vertical limb of the respective slide member; wherein the first slide member has a flexible strap extending from one end of the vertical limb thereof, the flexible strap being in the form of a horizontal web extending to either side of the vertical limb and terminating in a tab, the flexible strap being mounted to slide in co-operating grooves formed on insides of the first and second case parts and extending partly around its periphery, and the tab protruding through a slit formed in a periphery of the first and second case parts which communicates with the grooves; wherein the first slide member has a further horizontal web extending from the other end of the vertical limb thereof and to either side of the vertical limb, the further horizontal web also being mounted to slide in the cooperating grooves formed on the insides of the first and second case parts; and wherein the vertical limb of the second slide member lies against the vertical limb of the first slide member with only the vertical webs of the metal shutters therebetween and wherein lateral movement of the second slide member relative to the first is prevented by abutment of ends of the vertical limb of the second slide member against ends of the flexible strap and the further horizontal web at their junction with the vertical limb of the first slide member.

6. A case assembly as claimed in claim 5 in which the second slide member has a second horizontal limb extending from the vertical limb thereof and below the first horizontal limb such that the second slide member has an F-shaped cross-section and wherein the second slide member is constrained against vertical movement by engagement of the second horizontal limb in a groove formed on the inside of the second case part.

* * * * *